Patented Nov. 7, 1950

2,529,283

UNITED STATES PATENT OFFICE 2,529,283

PREPARATION OF A SILICA-ALUMINA-MAGNESIA CATALYST

Eugene S. Corner, Roselle, and Kenneth K. Kearby, Cranford, N. J., assignors to Standard Oil Development Company, a corporation of Delaware No Drawing. Application June 20, 1946, Serial No. 678,165

1 Claim. (Cl. 252—455)

The present invention is concerned with an improved catalyst. It more specifically relates to improved catalysts used in cracking, reforming, isomerization, polymerization and alkylation processes. We are particularly concerned with the preparation of superior catalysts suitable for catalytic cracking operations which are prepared by incorporating an oxide, an hydroxide, a carbonate or a decomposable salt of magnesium with an hydrous alumina-silica composition.

It is well known in the art to employ various catalysts for the treatment of petroleum oils. Particularly suitable catalysts which had been employed in the cracking of petroleum oils comprise hydrous alumina-silica catalysts. These silica-alumina hydrogel catalysts are prepared by various procedures which are known in the art. One method employed for the preparation of catalysts of this character is to mix a 25° Bé. sodium silicate ($Na_2O:3.2SiO_2$) solution with an equal volume of a 23° Bé. sulfuric acid solution. The resulting mixture is allowed to set to a gel. The gel is broken into lumps and washed thoroughly with distilled water. The water is removed and the lumps are then soaked in a solution of aluminum sulfate. Approximately 16.7 lbs. of the hydrogel is used per gal. of solution containing 0.42 gram of alumina as sulfate. The lumps are soaked for approximately one hour after which the excess aluminum sulfate solution is removed and the lumps then soaked in a 3% ammonium hydroxide solution. Approximately 16.7 lbs. of the hydrogel is used per gallon of ammonium hydroxide solution. The hydrogel is soaked in the ammonium hydroxide solution for approximately one hour after which the ammonium hydroxide is removed and the lumps are washed until the wash water is free of the sulfate ions. The resulting product is dried at a temperature in the range from about 200–300° F. and then activated by heating for approximately 3 hours at a temperature of about 900° F.

While catalysts of this character are undoubtedly superior in many respects to other catalysts for the cracking of petroleum oils, their activity is adversely affected when they are treated with steam in order to remove undesirable constituents and to regenerate the catalyst. Various proposals and attempts have been made to overcome this problem. We have now discovered that when catalysts of this character are combined with magnesium oxide or with a decomposable salt of magnesium, the stability of a catalyst is appreciably increased.

The magnesium compound which we employ may comprise magnesium oxide or any decomposable salt of magnesium which will give the magnesium oxide on decomposition upon heating or by chemical precipitation followed by heating. Suitable decomposable salts of magnesium are e. g. magnesium hydroxide, magnesium carbonate, magnesium nitrate and magnesium chloride.

The amount of magnesium compound employed in conjunction with the hydrous alumina-silica catalyst may vary widely as, for example, in the range from about 5% to about 60% by weight as compared to about 95% to about 40% of the silica-alumina hydrogel catalyst by weight. However, in general it is preferred that the amount of magnesium compound employed be in the range from about 20% to about 50% by weight as compared to about 80% to 50% by weight of the silica-alumina by weight.

Our invention may be more readily understood by the following examples which are given for the purpose of illustrating the same.

EXAMPLE 1

A silica-alumina hydrogel was prepared which comprises about 80 to 90% water. The silica-alumina content comprised about 87% silica and about 13% alumina. Approximately 2480 grams of this hydrogel was mixed with sufficient distilled water to give a paste. Approximately 30.6 grams of heavy magnesia was then added to the paste and stirred. Additional distilled water was added to the paste to secure a slurry. This slurry was ball milled for about 12 hours and then dried in an oven at a temperature of about 220° F. with frequent stirring. The catalyst was pilled and calcined about 3 hours at a temperature of approximately 1250° F. in a silica tube.

This catalyst was used to crack an East Texas gas oil, the initial boiling point of which was above about 400° F. The cracking temperature was about 850° F. and the feed rate was 0.6 volume of gas oil per volume of catalyst per hour. About 38% of the feed gas oil by volume was converted to lower boiling hydrocarbons boiling below about 400° F.

EXAMPLE 2

A silica-alumina hydrogel similar to that described with respect to Example 1 was prepared. About 2393 grams of this hydrogel was mixed with distilled water to secure a slurry. Approximately 436 grams of magnesium chloride and 500 cc. of distilled water was added to the hydrogel slurry. The mixture was stirred for 2 hours and additional water added to maintain the water slurry. At the end of the two hour period about 564 cc. of an ammonium hydroxide solution was slowly added to the slurry with stirring. The ammonium hydroxide solution comprised about 50% concentrated ammonium hydroxide and about 50% distilled water. The solution was then stirred for about two hours at which time the pH value of the solution was 12. The solution was filtered and the precipitate washed with 8 liters of distilled water. The filtered cake was reslurried in 8 liters of distilled water, then filtered and washed on the filter with an additional 8 liters of distilled water. This washing procedure was continued until the wash water was completely free of chloride ions. The precipitate was dried at a temperature of about 220° F. The catalyst was pilled and calcined at 1250° F. for a period of three hours in a silica tube in a stream of dry nitrogen. The final catalyst had a composition of approximately 75% silica-alumina and 25% magnesia.

This catalyst was employed to crack an East Texas gas oil, the initial boiling point of which was above about 400° F. The cracking temperature was about 850° F. while the feed rate was 0.6 volume of oil per volume of catalyst per hour. About 45% of the feed oil was converted to lower boiling hydrocarbons boiling below about 400° F.

EXAMPLE 3

A silica-alumina hydrogel was prepared which comprised about 87% silica and 13% alumina. The silica-alumina hydrogel was prepared by impregnation of the washed silica hydrogel with an aluminum salt solution followed by precipitation of the alumina with ammonia followed by washing. About 30% of dry heavy magnesium oxide was mulled in a ball mill with the silica-alumina hydrogel. The catalyst was dried and heat treated at a temperature of about 850° F. and then treated at a temperature of about 1250° F. This catalyst comprising 30% magnesia was compared with a catalyst comprising 100% silica-alumina with the following results:

East Texas gas oils, boiling above about 400° F. were cracked at a temperature of 850° F. and at atmospheric pressure. The feed rates employed were 0.6 volume of oil per volume of catalyst per hour.

EXAMPLE 4

Catalyst compositions in accordance with our invention may comprise compositions as follows:

Table B

|  | Mix I | Mix II | Mix III | Mix IV |
|---|---|---|---|---|
|  | Per Cent | Per Cent | Per Cent | Per Cent |
| MgO | 5 | 60 | 5.0 | 38.0 |
| Al₂O₃ | 47.5 | 20 | 4.7 | 2.0 |
| SiO₂ | 47.5 | 20 | 90.3 | 60.0 |

Other modifications of our catalyst are obvious to those skilled in the art. For example, instead of alumina impregnated silica hydrogel, a silica-alumina plural gel or a mixture of the separately prepared silica and alumina hydrogels may be employed. Our invention generally comprises preparing cracking catalysts by incorporating an oxide, a hydroxide, a carbonate, a chloride or an equivalent decomposable salt of magnesium with a hydrous alumina-silica catalyst composition. The salts of magnesium which are satisfactory are those which will give the oxide on decomposition, either by heating or by chemical precipitation followed by heating.

We claim:

A process for the manufacture of catalytic materials suitable for the conversion of hydrocarbon oils and characterized by high stability in the presence of steam at high temperatures which comprises preparing a silica hydrogel, washing said hydrogel to remove reaction impurities therefrom, thereafter impregnating the washed hydrogel with a solution of an aluminum salt having a concentration such as to form a dried product containing about 87% silica and about 13% alumina on a water-free basis, treating the impregnated hydrogel with an ammonical solution to decompose said aluminum salt and thereby precipitate alumina and form ammonium salts, washing the resulting product to remove the ammonium salts therefrom, thereafter mulling the alumina-impregnated hydrogel with sufficient magnesia to form a final dried product containing about 30% magnesia and thereafter drying and activating the resulting product.

Table A

|  | Pretreating Temp. of Catalyst | | | | Activated at 1250° F. and Steamed 24 Hrs. 1050° F., 60 p. s. i. g., Per Cent D+L¹ |
|---|---|---|---|---|---|
|  | 1250° F. | | | 1400° F., Per Cent D+L¹ | |
|  | Per Cent D+L¹ | Wt. Per Cent Carbon | Octane Number Gasolene | | |
| Silica-Alumina Catalyst: 13.5% Al₂O₃, No MgO | 55.0 | 5.5 | 89.2 | 48.0 | 27.0 |
| Mixture: 70% SiO₂-Al₂O₃ Catalyst above and 30% MgO | 56.5 | 5.9 | 83 | 45.5 | 44.0 |
| Check Steam Test | | | | | 51.0 |

¹ Percentage of hydrocarbon in the liquid product boiling below 400° F.

EUGENE S. CORNER.
KENNETH K. KEARBY.

REFERENCES CITED

The following references are of record in the file of this patent:

UNITED STATES PATENTS

| Number | Name | Date |
|---|---|---|
| 2,270,090 | Thomas | Jan. 13, 1942 |
| 2,281,919 | Connolly | May 5, 1942 |
| 2,340,934 | Connolly | Feb. 8, 1944 |
| 2,343,295 | Bailie et al. | Mar. 7, 1944 |
| 2,371,069 | Ruthruff | Mar. 6, 1945 |
| 2,387,596 | Marisic | Oct. 23, 1945 |
| 2,389,780 | Ipatieff et al. | Nov. 27, 1945 |
| 2,390,556 | Ruthruff | Dec. 11, 1945 |
| 2,399,261 | Thomas | Apr. 30, 1946 |
| 2,440,743 | Gary | May 4, 1948 |
| 2,459,987 | Billisoly | Jan. 25, 1949 |